(12) United States Patent
Rupp et al.

(10) Patent No.: US 11,009,245 B2
(45) Date of Patent: May 18, 2021

(54) METHOD AND SYSTEM FOR PROACTIVELY AND REMOTELY DIAGNOSING AN HVAC SYSTEM

(71) Applicant: WATSCO VENTURES LLC, Coconut Grove, FL (US)

(72) Inventors: Steven Rupp, Miami, FL (US); Aaron J. Nahmad, Miami Beach, FL (US); Mario A. Cruz, Miami, FL (US)

(73) Assignee: WATSCO VENTURES LLC, Coconut Grove, FL (US)

( * ) Notice: Subject to any disclaimer, the term of this patent is extended or adjusted under 35 U.S.C. 154(b) by 0 days.

(21) Appl. No.: 17/000,833

(22) Filed: Aug. 24, 2020

(65) Prior Publication Data

US 2020/0386430 A1 Dec. 10, 2020

Related U.S. Application Data

(63) Continuation of application No. 15/153,950, filed on May 13, 2016, now Pat. No. 10,753,630.

(60) Provisional application No. 62/162,316, filed on May 15, 2015.

(51) Int. Cl.
| F24F 11/30 | (2018.01) |
| F24F 110/00 | (2018.01) |
| F24F 11/32 | (2018.01) |
| F24F 11/56 | (2018.01) |
| G05B 15/02 | (2006.01) |

(52) U.S. Cl.
CPC ............ *F24F 11/30* (2018.01); *F24F 11/32* (2018.01); *F24F 11/56* (2018.01); *F24F 2110/00* (2018.01); *G05B 15/02* (2013.01)

(58) Field of Classification Search
None
See application file for complete search history.

(56) References Cited

U.S. PATENT DOCUMENTS

| 7,383,158 B2 | 6/2008 | Krocker et al. |
| 9,168,315 B1 | 10/2015 | Scaringe et al. |
| 9,417,000 B1 | 8/2016 | Scaringe et al. |
| 9,435,576 B1 | 9/2016 | Scaringe et al. |
| 2003/0055603 A1 | 3/2003 | Rossi et al. |
| 2005/0228607 A1* | 10/2005 | Simons ............ G05D 23/1917 702/122 |
| 2006/0090484 A1 | 5/2006 | Bell et al. |
| 2010/0298981 A1* | 11/2010 | Chamorro ............... G01D 4/00 700/276 |
| 2013/0245965 A1* | 9/2013 | Kane ................ G05B 23/0264 702/33 |
| 2014/0000294 A1* | 1/2014 | Kates .................... F24F 3/1603 62/56 |
| 2014/0257575 A1 | 9/2014 | Roy |
| 2014/0260381 A1 | 9/2014 | Marte et al. |
| 2014/0266755 A1 | 9/2014 | Arensmeier et al. |
| 2014/0371917 A1 | 12/2014 | Rite |
| 2016/0161139 A1* | 6/2016 | Asmus .................... F24F 11/74 165/208 |
| 2016/0328945 A1 | 11/2016 | Greisser et al. |

* cited by examiner

*Primary Examiner* — Gregory J Toatley, Jr.
*Assistant Examiner* — Terence E Stifter, Jr.
(74) *Attorney, Agent, or Firm* — DLA Piper LLP (US)

(57) ABSTRACT

Methods and systems for providing remote and proactive diagnostics of HVAC (heating, ventilating, and air conditioning) equipment and HVAC systems.

18 Claims, 4 Drawing Sheets

METHOD AND SYSTEM FOR PROACTIVELY AND REMOTELY DIAGNOSING AN HVAC SYSTEM

CLAIM OF PRIORITY

This application is a continuation application to U.S. application Ser. No. 15/153,950 filed May 13, 2016, which claims priority from U.S. Provisional Application No. 62/162,316, filed May 15, 2015, the entire contents of which are incorporated herein by reference in their entireties.

FIELD OF THE INVENTION

The disclosed embodiments relate to methods and systems for providing remote and proactive diagnostics of HVAC (heating, ventilating, and air conditioning) equipment and HVAC systems.

BACKGROUND

HVAC systems can be used to regulate the environment within an enclosed space. The performance of HVAC systems can degrade over time, fail, or otherwise operate in a less than ideal manner, which can produce undesirable results. While faults are indicative of a failure, many faults do not result in immediate system shut down or costly damages. However, most faults, if unnoticed or untreated for a long period of time, could adversely affect system performance, its useful life, and lifecycle cost. Because most home owners, or those responsible for taking care of residential or commercial HVAC systems (hereinafter collectively referred to herein as "users"), wait until there is a serious problem or a fault before requesting maintenance or repairs, more damage can occur to the system, reducing its lifetime and adding additional expense to the user.

Accordingly, there is a need and desire for a better way to monitor and diagnose the "health" of an HVAC system, and a better way to schedule/provide maintenance and repairs of an HVAC system.

SUMMARY OF THE INVENTION

Embodiments disclosed herein provide a method of remotely and proactively diagnosing HVAC equipment. The method comprises providing at least one sensor connected to one or more components of the HVAC equipment; connecting the at least one sensor and the HVAC equipment to an on-premises monitoring device; collecting, at the monitoring device, data from the at least one sensor and the HVAC equipment; and diagnosing the collected data to determine if the HVAC equipment requires maintenance.

In another embodiment, a system for remotely and proactively diagnosing HVAC equipment is provided. The system comprises at least one sensor connected to one or more components of the HVAC equipment; and an on-premises monitoring device connected to HVAC equipment and the at least one sensor. The on-premises monitoring device being adapted to collect data from the at least one sensor and the HVAC equipment; diagnose the collected data to determine if the HVAC equipment requires maintenance; and transmit the collected data to a remote device for remote diagnosis used for preventative maintenance.

DETAILED DESCRIPTION

Figure 1:
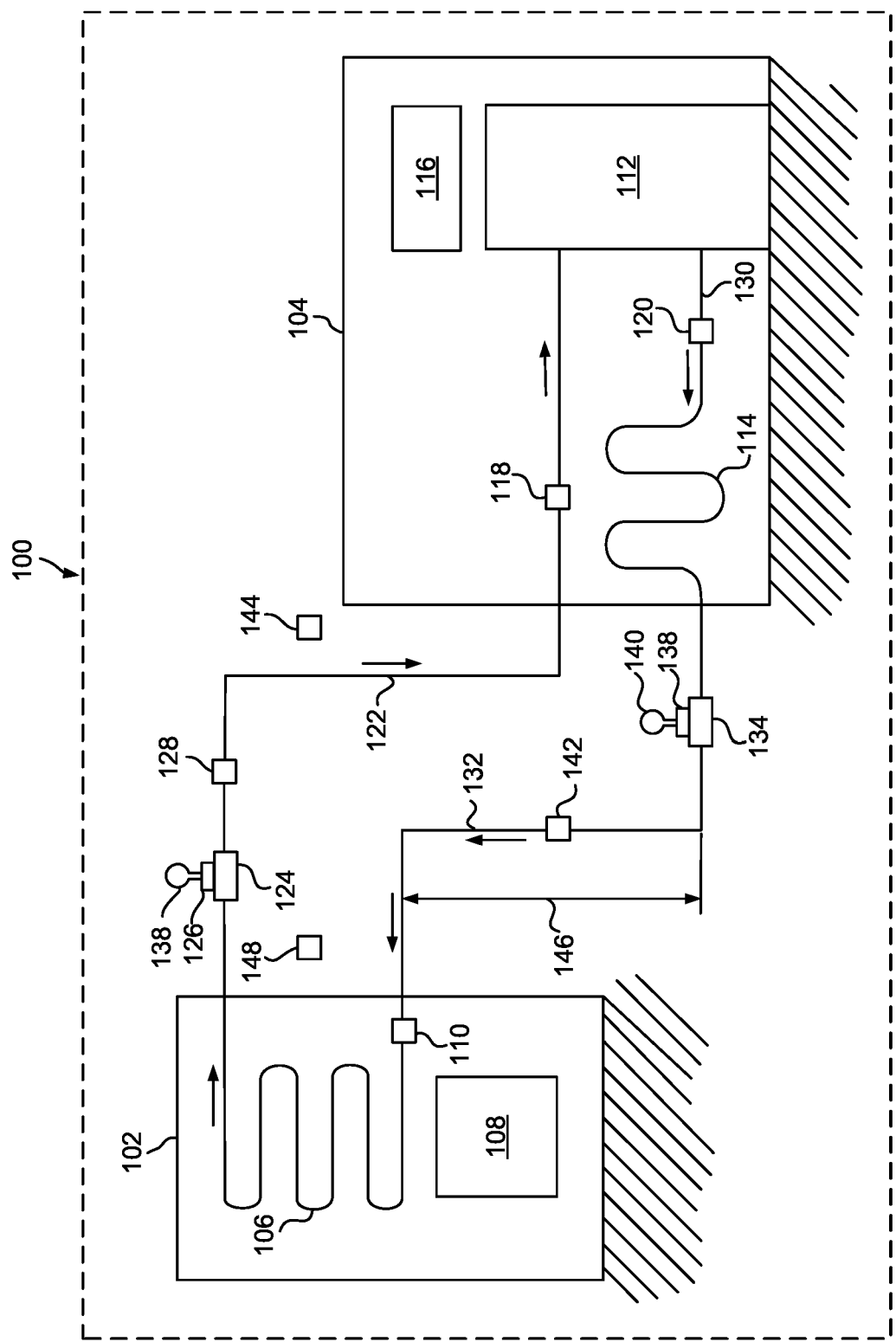
FIG. 1 illustrates an example HVAC system for use in an embodiment disclosed herein

The disclosed embodiments relate to and provide remote and proactive diagnostics of HVAC equipment or an HVAC system. Accordingly, the disclosed embodiments provide the ability to remotely measure e.g., electrical health, run state, superheat, subcooling and/or other conditions of an HVAC unit for the purposes of assessing the health and efficiency of an HVAC system. The disclosed embodiments will collect critical system data using a series of unit connected sensors and use test/evaluation calculations based on the input sensor information for making evaluations of system performance. Wireless technology (e.g., cellular communications, WLAN, Wi-Fi, etc.) is used to transmit pertinent information to a data collection server for deeper analysis, monitoring, alerting and tracking.

In one embodiment, users (e.g., consumers and technicians) are provided access to one or more dashboards that organize and present information in a user friendly manner. Automatic technician dispatch can occur when certain conditions are present and/or violated (e.g., certain faults or degraded operation are detected).

In one or more embodiments disclosed herein, sensors will be placed and used to e.g., determine: (1) pressure at the suction line service valve; (2) temperature on the suction line; (3) pressure at the liquid line service valve; (4) temperature on the liquid line; (5) line voltage at the compressor; (6) system run state; and/or (7) ambient temperature located near the service valves. In addition to, or alternatively, sensors may be placed and used to determine one or more of: (1) airflow in CFM (cubic feet per minute) at the coil; (2) fan motor vibration; (3) blower vibration; (4) supply side air temperature; (5) return air temperature; and (6) compressor external temperature, to name a few.

According to the disclosed principles, the HVAC service provider/maintainer will also install an HVAC monitoring device (as part of or in addition to the installed HVAC equipment) at a premises that, among other things, monitors the installed sensors and other signals to proactively diagnose the health of the installed HVAC system. The monitored results can be transmitted from the on-premises HVAC monitoring device to the service provider/maintainer's computer/server or other back office equipment and used to diagnose the HVAC system and automatically schedule maintenance or repair service calls. In one embodiment, the on-premises HVAC monitoring device may be located on the condensing unit, located outside the home/building. In other embodiments, the on-premises HVAC monitoring device may be located indoors, on or near the air handler and could be meshed to the outdoor unit. Other meshed devices such as e.g., temperature, humidity and air quality sensors, located within key areas of the home/building could also be used to enhance the sensing ability of the on-premises HVAC monitoring device.

The on-premises HVAC monitoring device will be connected to or in communication with various sensors positioned throughout the indoor and outdoor HVAC equipment.

For example, there can be pressure sensors on each of the Schrader valves (high side and low side), temperature sensors on the liquid line at the outlet of the compressor, a temperature sensor on the suction line at the outlet of the evaporator, an ambient air temperature sensor near the high and low side Schrader valves (service ports), to name a few. In addition, system run state and power cycle control at the contactor/relay located within the condensing unit can also be used to monitor system run time durations and average cycle times as well as afford the ability to interrupt service if required. The system could be placed in "crippled mode" which would adjust the system cycles such that the temperature would be significantly warmer (in AC mode) or cooler (in heat mode) than the set point.

In addition, the disclosed embodiments will be capable of diagnosing, either at the on-premises HVAC monitoring device installed at the HVAC system or remotely from the provider/maintainer's server/computer, conditions based on more than one sensor value. For example, the disclosed embodiments will be capable of making superheat and subcooling measurements, calculating run time statistics and will also have the ability to control the system (i.e., run control) by e.g., disrupting electrical connectivity when out of control/specification measurements are determined. The disclosed embodiments can set alerts for a dispatcher and provide additional root-cause analysis and repairs. It should be appreciated, however, that the information gathered and monitored can be used for multiple purposes and the disclosed principles are not to be limited to the specific examples described herein. That is, other types of remote diagnoses can be performed in accordance with the principles disclosed herein.

Superheat can be determined by: (1) cycling the system for approximately 10 minutes; (2) measuring suction line pressure; (3) measuring suction line temperature at the service port; (4) determining evaporator saturation temperature with standard pressure-temperature chart values; and (5) subtracting the evaporator saturation value from the suction line temperature to determine the superheat value. Adequate superheat values can then be insured. Moreover, the system can be diagnosed for problems before a complete breakdown of the equipment occurs. For example, if the superheat value is too low, liquid can be returning through the compressor, causing damage along the way. This can be indicative of improper refrigerant charge, thermal expansion device issues, clogged filter-drier or a dirty condenser coil. In one embodiment, the dispatcher can schedule maintenance and/or a repair automatically based on this information.

Subcooling can be determined by: (1) running the system until it cycles off based on the thermostat set point (cycling off one once is enough); (2) measuring the pressure on the liquid line; (3) measuring the liquid line temperature at an outlet of compressor; (4) determining the condenser saturation temperature with standard pressure-temperature chart values; and (5) subtracting the condenser saturation temperature from the liquid line temperature to determine the subcooling value. It should be appreciated that an inadequate value can identify issues with airflow over the condenser, insufficient refrigerant charge or problems with the expansion valve. In one embodiment, the dispatcher can schedule maintenance and/or a repair automatically based on this information.

The run time statistics may be determined by: (1) tracking the start/stop actions of the units; (2) aggregating the data centrally to determine run times and cycle durations; and (3) calculating averages by time and/or frequency. It should be appreciated that short cycles, long cycles and/or changes from normal operations with ambient temperature relativity can indicate system health issues. In one embodiment, the dispatcher can schedule maintenance and/or a repair automatically based on this information.

FIG. 1 shows an example HVAC system 100 comprising an indoor unit (also referred to as an evaporator unit) 102 and an outdoor unit (also referred to as a condensing unit) 104 that could be used in an embodiment disclosed herein. The indoor unit 102 comprises an indoor heat exchanger (also referred to as an evaporator coil) 106, a blower 108, and a refrigerant flow restrictor 110. The outdoor unit 104 comprises a refrigerant compressor 112, an outdoor heat exchanger (also referred to as a condenser coil) 114, a fan 116, a low pressure switch 118, and a high pressure switch 120. Most generally, an output of the indoor heat exchanger 106 is connected to an input of the compressor 112 via a suction line 122. In this embodiment, a suction service valve 124 is configured to selectively allow refrigerant flow into and out of the suction line 122 through a suction line pressure tap 126.

Further, a charge port 128 is configured to selectively allow refrigerant flow into and out of the suction line 122 through the charge port 128. The charge port 128 may be equipped with a check valve, such as a Schrader valve, to selectively allow fluid flow through the charge port 128. A refrigerant output of the compressor 112 is connected to an input of the outdoor heat exchanger 114 via a discharge line 130. An output of the heat exchanger 114 is connected to an input of the flow restrictor 110 via a liquid line 132. In this embodiment, a liquid line service valve 134 is configured to selectively allow refrigerant flow into and out of the liquid line 132 through a liquid line pressure tap 136. An output of the flow restrictor 110 is connected to an input of the indoor heat exchanger 106.

In some embodiments, the HVAC system 100 further comprises a suction line pressure gauge 138 configured to determine and/or display a pressure of the refrigerant within the suction line 122, a liquid pressure gauge 140 configured to determine and/or display a pressure of the refrigerant within the liquid line 132, a liquid line thermometer 142 configured to determine and/or display a temperature of the liquid line 132, and an ambient temperature sensor 144 configured to measure and/or display a temperature of the environment immediately surrounding the outdoor unit 104. The HVAC system 100 further comprises an indoor temperature sensor 148 configured to determine and/or display an ambient indoor temperature associated with the indoor unit 102.

Figure 2:
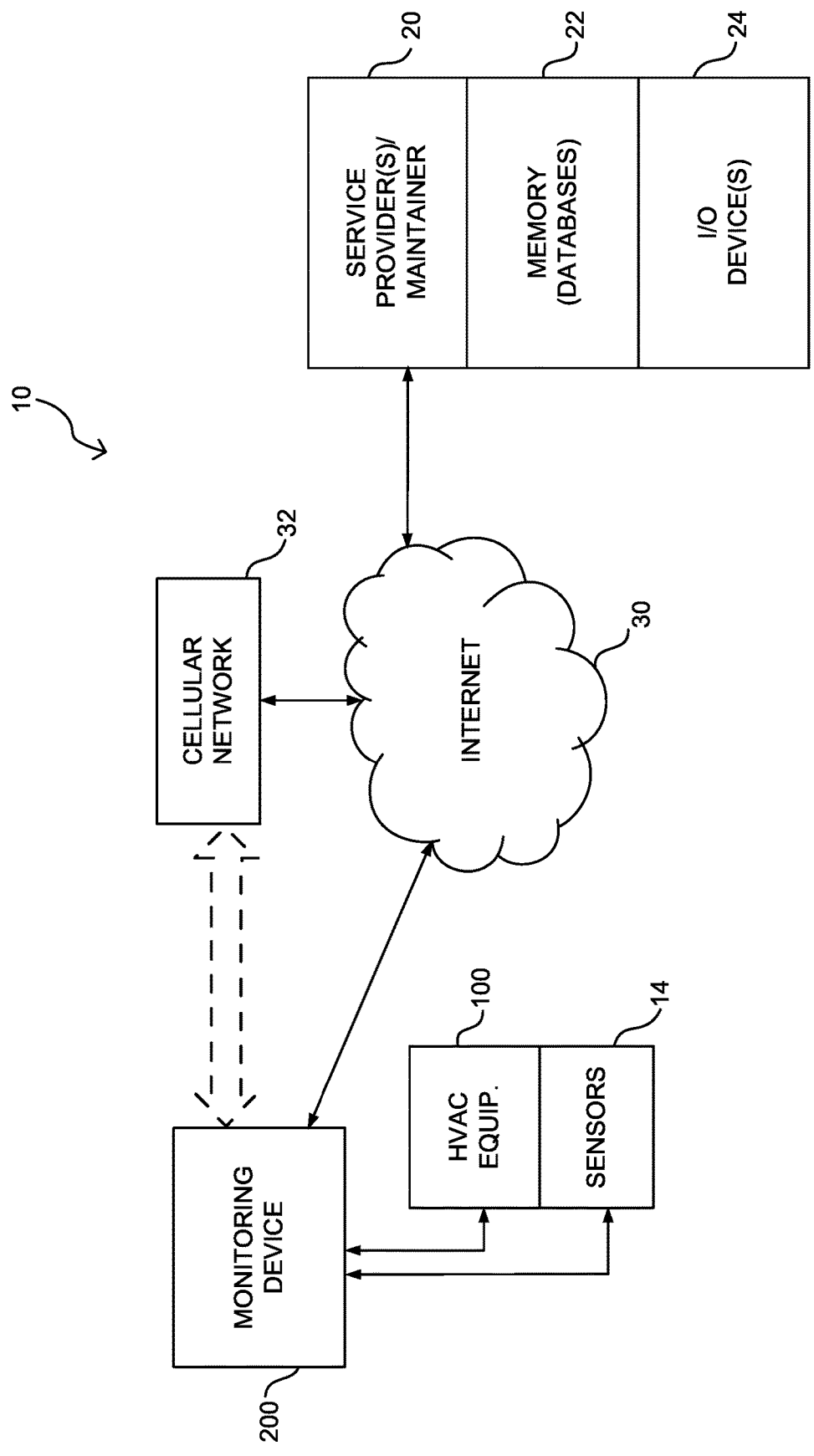
FIG. 2 illustrates an example monitoring and diagnostic system constructed in accordance with the disclosed principles.

FIG. 2 illustrates an example diagnostic system 10 constructed in accordance with an example embodiment disclosed herein. The system 10 comprises at least one service provider/maintainer server 20 and an on-premises HVAC monitoring device 200 for operating embodiments disclosed herein. While FIG. 2 illustrates the use of a service provider/maintainer server 20, it should be appreciated that other computing devices (e.g., personal computer, workstation, and the like) could be used to practice the embodiments disclosed herein. The diagnostic system 10 also comprises HVAC equipment, such as e.g., the HVAC system 100 illustrated in FIG. 1, installed at the premises. In addition, sensors 14 may also be installed at the premises and within or connected to the HVAC system 100 to provide the benefits discussed herein. The HVAC system 100 and sensors 14 communicate with the on-premises HVAC monitoring device 200 in any conventional matter, including wired and wireless communication methods as discussed herein.

The above described control, monitoring, diagnostics and service dispatching functions are preferably implemented in software (i.e., computer instructions) that are stored in a computer readable memory and executed by a processor. To that end, the service provider server 20 includes or is connected to a memory 22 for storing computer instructions required to implement the control, monitoring, diagnostics and service dispatching functions described herein and to store the various databases and subscriber information used during the processes described herein. Each server 20 can access the on-premises HVAC monitoring device 200, and be accessed by the on-premises HVAC monitoring device 200, via a cellular network 32 or other wireless network 30 (shown as the Internet in this example). Each server 20 can include input/output devices 24 such as displays, scanners, printers, etc. The on-premises HVAC monitoring device 200 will be capable of wireless communications such as e.g., Internet-based communications, and other "out of band" communications (e.g., cellular) for subscribers that do not have Internet access.

In one embodiment, the on-premises HVAC monitoring device 200 is capable of communicating with the service provider/maintainer's server 20 via wireless communications (e.g., cellular communications, WLAN, Wi-Fi, etc.). The disclosed on-premises HVAC monitoring device 200 and sensors 14 will provide the control, monitoring and diagnostic capabilities for the installed HVAC system 100 discussed above and will communicate the necessary data to the service provider, which can then use the received data for proactive diagnostics, and setup maintenance and repair calls.

In another embodiment, the installed on-premises HVAC monitoring device 200 can work on its own meshed network (like 6LoWPAN or ZigBee) and/or on Wi-Fi and/or Bluetooth (to connect with devices worn by a subscriber). FIG. 2 shows the on-premises HVAC monitoring device 200 having connections to the HVAC system 100 and sensors 14. It should be appreciated that the disclosed diagnostic system 10 is not to be limited to these specific devices and that other devices for monitoring the HVAC system 100 or its components could be included.

Figure 3:
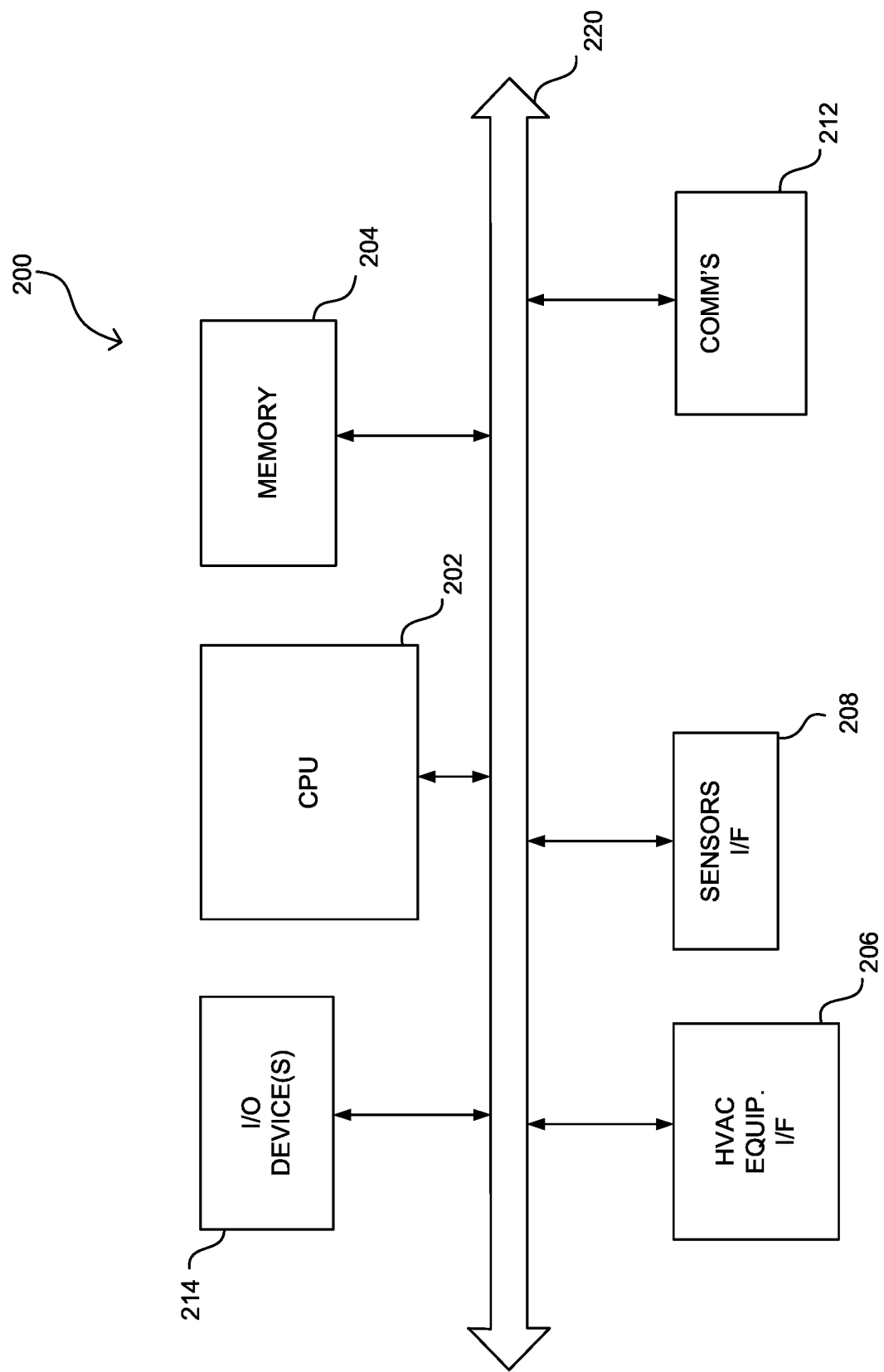
FIG. 3 illustrates an example of the on-premises HVAC monitoring device used in the FIG. 2 system and constructed in accordance with the disclosed principles.

FIG. 3 illustrates an example on-premises HVAC monitoring device 200 constructed in accordance with an example embodiment disclosed herein. The on-premises HVAC monitoring device 200 may comprise a processor (CPU) 202, memory 204 and input/output devices 214 communicating over a bus 220, allowing the device 200 to be programmed and accessed on site. As understood by those skilled in the art, the above described control, monitoring and diagnostic functions are preferably implemented in software (i.e., computer instructions) that are stored in the computer readable memory 204 and executed by the processor 202. In addition, the on-premises HVAC monitoring device 200 will have one or more communication mechanisms 212, allowing it to transmit and receive diagnostic or control information from a remote device, as well as to receive wireless inputs from a device within the premises. One suitable communication mechanism 212 is a Bluetooth communication device. The on-premises HVAC monitoring device 200 may also comprise one or more interfaces 206, 208 for communicating with external equipment such as e.g., sensors (e.g., using interface 208) and components of the HVAC evaporator and condensing units (e.g., using interface 206), among other components.

The on-premises HVAC monitoring device 200 will be able to diagnose the user's HVAC system 100 (as described above) and report e.g., diagnostic codes back to the service provider(s)/maintainer(s), which will then use the codes to schedule preventive maintenance and repairs. In one embodiment, the service provider/maintainer can set up a call center to process and respond to technical problems with the subscriber's equipment. This way, the service provider/maintainer can provide proactive service, which should prevent major problems and service interruption. This is a major advantage over existing HVAC systems, which do not include digital interfaces for providing digital diagnostics in this manner. It should be appreciated that the on-premises HVAC monitoring device 200 can be used with older technology via a mechanical/switched based interface for obtaining the diagnostic information described herein.

Figure 4:
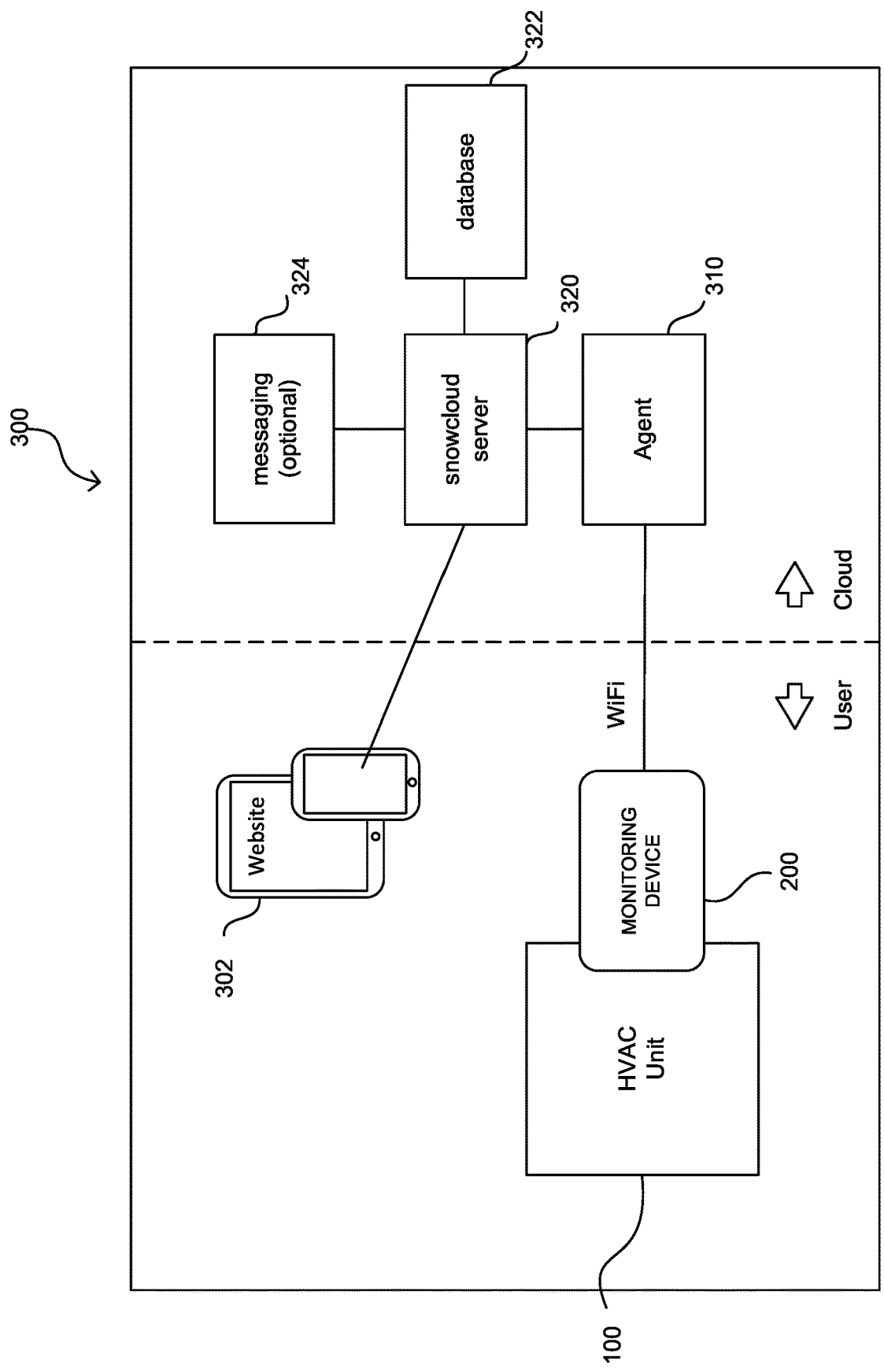
FIG. 4 illustrates an example system architecture constructed in accordance with the disclosed principles for implementing a "state of HVAC health" dashboard.

In one embodiment, the consumer and/or technicians can access dashboards that organize and present information in a user friendly manner. Users will have access to a "State of HVAC Health" dashboard that will give them the latest statistics and results from recent test samples. In one embodiment, the ability to request a service call could be made through the dashboard. Automatic technician dispatch can occur when certain conditions are violated (e.g., certain faults or degraded operation are detected). FIG. 4 illustrates a high level architecture of a system 300 constructed in accordance with the disclosed principles for implementing the dashboard.

On the user side, the system 300 comprises the HVAC system 100, the monitoring device 200 (as well as other system components discussed above) and user devices 302 for displaying a graphical user interface or other type of interface for providing an interactive "State of HVAC Health" dashboard. As can be appreciated, the user devices 302 can include a smartphone, tablet, laptop, personal computer, or other computing device. On the cloud side, the system 300 comprises an agent 310 for communicating with the user's monitoring device 200, a server computer 320, database 322 and a messaging system 324. One or more of the agent 310, server 320 or database 322 may be part of or in communication with the service provider/maintainer's server 20 or memory 22 described above. Diagnostic and other information can be wirelessly passed from the monitoring device 200 through the agent 310 and server 320 to one or more user devices 302. While FIG. 4 illustrates a Wi-Fi communication technique, it should be appreciated that other communication forms can be implemented (e.g., out of band cellular communications).

The foregoing examples are provided merely for the purpose of explanation and are in no way to be construed as limiting. While reference to various embodiments is made, the words used herein are words of description and illustration, rather than words of limitation. Further, although reference to particular means, materials, and embodiments are shown, there is no limitation to the particulars disclosed herein. Rather, the embodiments extend to all functionally equivalent structures, methods, and uses, such as are within the scope of the appended claims.

Additionally, the purpose of the Abstract is to enable the patent office and the public generally, and especially the scientists, engineers and practitioners in the art who are not familiar with patent or legal terms or phraseology, to determine quickly from a cursory inspection the nature of the technical disclosure of the application. The Abstract is not intended to be limiting as to the scope of the present inventions in any way.

What is claimed is:

1. A method comprising:
   providing at least one sensor within a premises heated and or cooled by heating, ventilating, and air conditioning (HVAC) equipment;
   connecting the at least one sensor and the HVAC equipment to an on-premises monitoring and control device;
   the on-premises monitoring and control device receiving data from the at least one sensor as an input to the on-premises monitoring and control device;
   controlling, via the on-premises monitoring and control device, at least one component of the HVAC equipment to adjust a temperature and/or an air quality within the premises based on the data from the at least one sensor; and
   controlling operation of the HVAC equipment from the on-premises monitoring and control device to place the HVAC equipment into a state to alter the temperature of the HVAC equipment, the altered temperature being warmer than a temperature set point for the HVAC equipment in an air conditioning (AC) mode and the altered temperature being cooler than the set point for the HVAC equipment in a heat mode.

2. The method of claim 1, further comprising providing a communication between the on-premises monitoring and control device and an off-premises device controlled by a service provider.

3. The method of claim 2, wherein the communication is used by the service provider to determine whether the HVAC equipment requires servicing.

4. The method of claim 1, wherein the HVAC equipment is adjusted to control a temperature within the premises.

5. The method of claim 1, wherein the HVAC equipment is adjusted to control air quality within the premises.

6. The method of claim 1, further comprising:
   providing a set of sensors and connecting the set of sensors to at least three components of the HVAC equipment, wherein a first sensor of the set of sensors is a first pressure sensor and is connected at a high side Schrader valve and a second sensor of the set of sensors is a second pressure sensor and is connected at a low side Schrader valve.

7. The method of claim 6, wherein providing a set of sensors further comprises providing one temperature sensor on a suction line, one temperature sensor on a liquid line, and one line sensor at a compressor.

8. The method of claim 6, wherein providing a set of sensors further comprises providing a temperature sensor at a liquid line at an outlet of a condenser, a temperature sensor at a suction line at an outlet of an evaporator, and/or an ambient air temperature sensor near the high and low side Schrader valves.

9. The method of claim 1, further comprising a step of determining one of a superheat value, subcooling value, thermodynamic calculations or runtime statistics of the HVAC equipment.

10. A system comprising:
    an on-premises monitoring and control device connected to heating, ventilating, and air conditioning (HVAC) equipment providing heating and or cooling to a premises;
    at least one sensor within the premises and in communication with the on-premises monitoring and control device; and
    an off-premises computing device controlled by a service provider and in communication with the on-premises monitoring and control device via a network,
    the on-premises monitoring and control device being configured to:
      obtain data from the at least one sensor,
      control at least one component of the HVAC equipment to adjust a temperature and/or an air quality within the premises based on the data from the at least one sensor, and
      control operation of the HVAC equipment to place the HVAC equipment into a state to alter the temperature of the HVAC equipment, the altered temperature being warmer than a temperature set point for the HVAC equipment in an air conditioning (AC) mode and the altered temperature being cooler than the set point for the HVAC equipment in a heat mode.

11. The system of claim 10, wherein the on-premises monitoring and control device is further configured to provide a communication to the off-premises monitoring and control device.

12. The system of claim 11, wherein the communication is used by the service provider to determine whether the HVAC equipment requires servicing.

13. The system of claim 10, wherein the HVAC equipment is adjusted to control a temperature within the premises.

14. The system of claim 10, wherein the HVAC equipment is adjusted to control air quality within the premises.

15. The system of claim 10, further comprising:
    a set of sensors connected to at least three components of the HVAC equipment, wherein a first sensor of the set of sensors is a first pressure sensor and is connected at a high side Schrader valve and a second sensor of the set of sensors is a second pressure sensor and is connected at a low side Schrader valve.

16. The system of claim 15, further comprising one temperature sensor on a suction line, one temperature sensor on a liquid line, and one line sensor at a compressor.

17. The system of claim 15, further comprising a temperature sensor at a liquid line at an outlet of a condenser, a temperature sensor at a suction line at an outlet of an evaporator, and/or an ambient air temperature sensor near the high and low side Schrader valves.

18. The system of claim 10, wherein the on-premises monitoring and control device is further configured to determine one of a superheat value, subcooling value, thermodynamic calculations or runtime statistics of the HVAC equipment.

* * * * *